| United States Patent [19] | [11] | 4,173,699 |
|---|---|---|
| Borg | [45] | Nov. 6, 1979 |

[54] PROCESS FOR MANUFACTURING PETROLEUM RESINS FOR ADHESIVE THERMOFUSIBLE COMPOSITIONS

[75] Inventor: Patrick Borg, Rueil-Malmaison, France

[73] Assignee: Ato Chimie, Courbevoie, France

[21] Appl. No.: 885,283

[22] Filed: Mar. 10, 1978

[30] Foreign Application Priority Data

Mar. 11, 1977 [FR] France ................................ 77 07324

[51] Int. Cl.$^2$ .......................................... C08F 240/00
[52] U.S. Cl. .................................... 526/237; 526/290; 528/487; 528/488; 528/490; 525/15
[58] Field of Search .............................. 526/290, 237

[56] References Cited

U.S. PATENT DOCUMENTS 2,750,359  6/1956  Hamner et al. ....................... 526/290
3,880,820  4/1975  Sato ....................................... 526/290

OTHER PUBLICATIONS

Slade, Polymer Molecular Weights, vol. 4, (part I) (1975) pp. 2 and 3, Marcel Dekker, Inc., N.Y.

*Primary Examiner*—Harry Wong, Jr.
*Attorney, Agent, or Firm*—Bacon & Thomas

[57] ABSTRACT

A process for manufacturing petroleum resins for adhesive thermofusible compositions, having a softening point comprised between 60° and 110° C., a molecular weight comprised between 700 and 1,500 and a Gardner color index less than 9, consisting in polymerizing a C$_5$ hydrocarbon distillation cut issuing from a steam cracking of naphtha or gas-oil and containing less than 5% isoprene and less than 1% cyclopentadiene, in the presence of a Friedel-Crafts catalyst.

8 Claims, No Drawings

PROCESS FOR MANUFACTURING PETROLEUM RESINS FOR ADHESIVE THERMOFUSIBLE COMPOSITIONS

The present invention concerns a process for manufacturing improved petroleum resins for adhesive thermofusible compositions obtained from $C_5$ hydrocarbon cuts.

It is well known that a polymerization of $C_5$ hydrocarbon cuts, containing a majority of unsaturated products in the presence of catalysts such as aluminum chloride or boron trifluoride, gives rise to resins which have a certain number of practical applications, especially in the adhesive field.

$C_5$ cuts are among the most used.

They usually contain the following hydrocarbons: n-pentane, isopentane, 1-pentene, 2-pentene, 2-methyl-1-butene, 3-methyl-1-butene, isoprene, trans and cis piperylene, cyclopentadiene.

The dienic compositions such as 1-3 pentadiene, isoprene and cyclopentadiene are usually present in large proportions.

However, too large a quantity of isoprene and cyclopentadiene present in the initial mixture gives rise to gels during polymerization, or raises the softening point of the thus formed polymer to a temperature which is too high for a good application of the petroleum resin in an adhesive thermofusible composition.

For thermofusible adhesives it is preferable that the softening point does not exceed 110° C. and is higher than 60° C.

Furthermore, the resins obtained from $C_5$ cuts, rich in isoprene and especially in cyclodiolefins, are not always very compatible with certain polymers, especially vinyl acetate/ethylene copolymers, which are present in adhesive thermofusible compositions. Moreover the presence of cyclodiolefins, cyclopentadiene or dicyclopentadiene in the $C_5$ hydrocarbon distillation cuts gives a more coloured finished product.

In order to remove the cyclopentadiene, a process, is usually used, which consists in heating the $C_5$ hydrocarbon cut for several hours at a temperature comprised between 90° and 150° C. During this heating process the cyclopentadiene is dimerised into dicyclopentadiene. Then the thus obtained mixture can be directly polymerized, as is taught in U.S. Pat. No. 3,709,854, or the dimer may be removed by a preliminary distillation of the $C_5$ cut. Thus the above cited drawbacks are greatly diminished. But they are not totally eliminated and the products obtained can have a certain incompatibility with the vinyl acetate/ethylene copolymers.

Moreover, this preliminary heating treatment presents the industrial drawback of increasing the reaction time by several hours, or implies supplementary heating equipment if it is desired to separate the heating treatment from that of the polymerization.

The present invention overcomes these drawbacks.

Petroleum resins having good adhesive properties, an improved tensile strength and a better compatibility with the addition polymers with which they are mixed and more particularly with the vinyl acetate/ethylene copolymers from the $C_5$ hydrocarbon cuts coming from the steam cracking of naphtha or gas-oil, can be obtained from the present invention.

According to the invention, these petroleum resins are obtained by polymerization in a solvent, without preliminary heating, and in the presence of a Friedel-Krafts catalyst such as aluminium chloride from a $C_5$ hydrocarbon distillation cut containing less than 5% isoprene and less than 1% cyclopentadiene.

An advantage of the resins according to the invention, is the lowering of their softening point which is comprised between 60° and 110° C., whereas when the $C_5$ hydrocarbon mixture contains isoprene and cyclodiolefins in large proportions, higher than 1%, the softening point is very much higher than 110° C.

Other advantages of the resins according to the invention are that they present better adhesive properties, an improved tensile strength and a good compatibility with the vinyl acetate/ethylene copolymers with which they are mixed in order to obtain adhesive thermofusible compositions. Moreover, the resins obtained according to the invention are less coloured than those which are prepared from cuts containing cyclodiolefins and more particularly dicyclopentadiene contained in the $C_5$ hydrocarbon cut having undergone a preheating treatment.

According to the invention the mixture of $C_5$ hydrocarbons which is used contains minor proportions of cyclodiolefins, less than 1% and preferably less than 0.5%, and the amount of isoprene in the mixture should be less than 5%, and preferably less than 3%.

In order to obtain such $C_5$ hydrocarbon mixtures, one starts with a hydrocarbon distillation cut, distilled between 10° and 180° C., containing less than 5% by weight of isoprene and preferably less than 3%. This cut is distilled on a column, the efficiency of which is comprised between 2 and 20 theoretical plates and that which is distilled before 50° is collected.

The cyclopentadiene dimerizes during the distillation and a $C_5$ cut is collected which contains less than 1% cyclopentadiene and less than 5% of isoprene.

In order to carry out the polymerization, the catalyst is placed in suspension in an aromatic, cycloaliphatic or aliphatic saturated hydrocarbon solvent or their mixtures. The the predistilled $C_5$ hydrocarbon mixture is gradually introduced, under agitation and at the desired temperature, into the catalyst suspension; the reaction is continued for the length of time that is required in order to obtain the polymer.

The aluminium chloride is then eliminated by successive washings with water or with a diluted alkaline solution, as for example with a 2 to 15% by weight of a sodium hydroxide solution, or with a diluted acid solution as for example hydrochloric acid or sulphuric acid solution.

These washings may be carried out between room temperature and 150° C. Nevertheless, it is preferable that they be carried out at a temperature comprised between 70° and 100° C. since the organic phase containing the resin is fairly fluid in this temperature interval, thus it is easier to eliminate the catalyst without the risk of chemical degradation of the obtained product.

The organic phase is then washed until it is neutralized, then submitted to a distillation up to a temperature of 120° C. in order to eliminate the non-reacted hydrocarbons as well as the solvent.

Then one proceeds with a steam distillation, raising the temperature until it reaches 200° to 250° C., in order to eliminate the oligomers having a low molecular weight.

The most appropriate catalysts are aluminium chloride or boron trifluoride used in the proportion of 0.1 to 5% and preferably 0.5 to 2% of the hydrocarbon mixture used.

The solvent used is an aromatic, cycloaliphatic or aliphatic saturated hydrocarbon, its boiling point being comprised between 20° and 150° C. Nevertheless, it is preferable to use, as a solvent, the hydrocarbon cut which did not react in the polymerization and which is recovered by distillation.

The proportion of solvent used is comprised between 5 and 30% by volume and preferably between 10 and 20%. The reaction temperature is comprised between −20° and 100° C., and preferably between 20° and 50° C.

The duration of the reaction is comprised between 1h and 12h and preferably between 3h and 6h. The Gardner colour index, which is preferably maintained less than 9, the softening point and the molecular weight are measured on the obtained raw products.

The products obtained are characterized by a softening point comprised between 60° and 110° C. and a molecular weight comprised between 700 and 1,500.

The flow and adhesive tests were carried out on the mixtures of petroleum resins according to the invention with vinyl acetate/ethylene copolymers containing 28% vinyl acetate having a melt-index of 10–20 and a paraffin with a melting point of 50°–52° C.

The following tests were carried out on thermofusible adhesive samples:

softening point (ASTM E 28)

breaking load determined with a dynamometer and at a speed of 50 mm per minute

% of breaking extension at a speed of 50 mm per minute shearing strength.

This measurement is expressed by the temperature at which the glue bond breaks when applying a given load (500 g) in order to separate the two test sheets (made of cardboard) which were glued together. These sheets are heated in an oven, the temperature of which rises steadily by 3° C. every ten minutes.

The following examples are given by way of illustration and are in no way restrictive.

EXAMPLE 1

1.9 g of toluene and 1 g of powderous aluminium chloride are introduced into a reactor under agitation. To said mixture, agitated vigorously, is then slowly added, for about 1h, 100 g of a hydrocarbon mixture issuing from a $C_5$–$C_6$ distillation cut having the following composition (expressed in weight):

| 2-methyl butene | 7% |
|---|---|
| other $C_5$ olefins | 12.5% |
| $C_5$ cycloolefins | 11.5% |
| 1.3-pentadiene | 30.0% |
| isoprene | 3.4% |
| other $C_5$ diolefins | 2.6% |
| $C_5$ cyclodiolefins | 0% |
| other $C_5$–$C_6$ hydrocarbons | 33.0% |

The temperature is maintained between 30° and 35° C. when introducing the hydrocarbon cut. The reaction is left to continue its course at the same temperature for 3h once one has finished adding the hydrocarbon cut.

The reaction mixture is then washed with a 10% sodium hydroxide solution; it is left to settle, the resin layer is separated and washed with water until the aqueous phase has been neutralized.

Then the organic phase is distilled to 120° C. and then stripped up to about 250° C. 35 g of a pale yellow brittle resin is obtained, having a Gardner colour index of 7, a softening point of 80° C. and a molecular weight of 1,130.

By mixing 40% by weight of this resin with 40% by weight of vinyl acetate/ethylene copolymer containing 28% of vinyl acetate and 20% of a paraffin with a melting point comprised between 50° to 52° C., a thermofusible glue is obtained having the following properties:

| softening point | in °C. | 71 |
|---|---|---|
| shearing temperature | in °C. | 66 |
| breaking load | in kg/cm$^2$ | 10 |
| % of extension | | 68 |

EXAMPLE 2

It is carried out like Example 1, but using as a solvent, instead of toluene, the hydrocarbons which did not react in a previous operation and which were recovered through distillation using a more isoprene-impoverished hydrocarbon cut, having the following composition (by weight):

| 2-methyl butene | 9.5% |
|---|---|
| other $C_5$ olefins | 14.0% |
| cycloolefins | 7.0% |
| 1-3 pentadiene | 16.8% |
| isoprene | 1.9% |
| other $C_5$ diolefins | 3.3% |
| cyclodiolefins | 0.5% |
| other $C_5$–$C_6$ hydrocarbons | 47.0% |

30 g of a resin is obtained having a Gardner colour index of 7, a softening point of 71° C. and a molecular weight of 1,030.

EXAMPLE 3

It is carried out like Example 1, with the same $C_5$–$C_6$ hydrocarbon cut as that given in Example 2, but using 2 g of aluminium chloride and executing the polymerization at a temperature of 45° C., 30 g of polymer is obtained, having a softening point of 69° C., a Gardner colour index of 7 and a molecular weight of 900.

EXAMPLE 4

In order to compare with Example 1, the polymerization takes place under the same operating conditions as Example 1, beginning with 100 g of a $C_5$–$C_6$ hydrocarbon cut, maintaining a higher proportion of isoprene (12.8%) and a very low proportion of cyclodiolefins (2.2%).

The ponderal composition is weight of this $C_5$–$C_6$ hydrocarbon cut is the following:

| 2-methyl butene | 6% |
|---|---|
| other $C_5$ olefins | 10.5% |
| $C_5$ cycloolefins | 4.4% |
| 1.3-pentadiene | 8.0% |
| isoprene | 12.8% |
| other $C_5$ diolefins | 2.7% |
| cyclopentadiene | 2.2% |
| other $C_5$–$C_6$ hydrocarbons | 53.4% |

38 g of a hard brittle pale yellow resin is obtained, having a Gardner colour index of 5, a softening point of 85° C. and a molecular weight of 1,180.

By mixing 40 g of this resin with 40 parts of a vinyl acetate/ethylene copolymer containing 28% vinyl acetate and 20 parts of a paraffin with a melting point of 50°-52° C., a thermofusible glue is obtained having the following properties:

| | | |
|---|---|---|
| softening point | in °C. | 58 |
| shearing temperature | in °C. | 54 |
| Breaking load | in kg/cm² | 5 |
| % of extension | | 20 |

In comparison with the results given in Example 1, it is noted that the presence of a sizable amount of isoprene has a considerable effect upon the tensile strength as well as the extension strength.

EXAMPLE 5

It is carried out like Example 1, and for comparison purposes 100 g of a C₅ cut, rich in isoprene and cyclodiolefins (11%), having the following ponderal composition, is polymerized:

| | |
|---|---|
| 2-methyl butene | 4.0% |
| other C₅ olefins | 11.0% |
| C₅ cycloolefins | 5.5% |
| 1-3 pentadiene | 11.5% |
| isoprene | 13.0% |
| other C₅ olefins | 3.5% |
| cyclodiolefins | 11.0% |
| other C₅-C₆ hydrocarbons | 40.5% |

45 g of a hard, brittle, pale yellow resin is obtained, having a Gardner colour index of 10, a softening point of 123° C. and a molecular weight of 1,220. With such a resin it is impossible to measure the adhesive mechanical properties because of a partial incompatibility with the vinyl acetate/ethylene copolymer.

Nevertheless it was noted that the presence of cyclodiolefins considerably raises the softening point which becomes too high for a heat-melting adhesive product.

EXAMPLE 6

The object of this Example is to give comparative results of the adhesive properties of the compositions obtained from resin 1 of Example 1, beginning with C₅ hydrocarbons having a small quantity of isoprene, and the resin 2 obtained in Example 4 from a C₅ hydrocarbon cut rich in isoprene.

The mixtures a, b, c and d are carried out with petroleum resin 1 or 2, a vinyl acetate/ethylene copolymer (VAE) containing 28% vinyl acetate and a paraffin (melting point = 50°-52° C.), and the percentages of which are given by weight in Table 1.

The following measurements were carried out on each mixture: softening point in °C., shearing temperature in °C., breaking load in kg/cm² and % of extension.

TABLE 1

| Components | Mixtures | | | |
|---|---|---|---|---|
| | a | b | c | d |
| Petroleum resin | 33 | 40 | 50 | 30 |
| VAE (28%) | 33 | 40 | 30 | 50 |

TABLE 1-continued

| Components | Mixtures | | | |
|---|---|---|---|---|
| | a | b | c | d |
| Paraffin | 33 | 20 | 20 | 20 |

The results summarized in the following Table 2 show that the considerable increase in the concentration of isoprene has an effect especially upon the extension properties and the tensile strength.

TABLE 2

| Petroleum resin in the composition | | Resin 1 | Resin 2 |
|---|---|---|---|
| Concentration in the initial hydrocarbon | | | |
| - of isoprene | | 3.4 | 12.8 |
| - of cyclodiolefins | | 0 | 2.2 |
| Softening point °C. | a | 65 | 54 |
| | b | 71 | 58 |
| | c | 68 | 57 |
| | d | 78 | 65 |
| Shearing temperature °C. | a | 62 | 54 |
| | b | 66 | 54 |
| | c | 62 | 46 |
| | d | 67 | 58 |
| Breaking load kg/cm² | a | 10 | 5 |
| | b | 10 | 5 |
| | c | 10 | — |
| | d | 10 | 7 |
| breaking extension % | a | 62 | 25 |
| | b | 66 | 20 |
| | c | 62 | — |
| | d | 67 | 30 |

What is claimed is:

1. A process for preparing petroleum resins for use in thermofusible adhesive compositions, which comprises the steps of polymerizing a C₅ hydrocarbon cut which contains less than 5% of isoprene and less than 1% of cyclopentadiene, in a hydrocarbon solvent having a boiling point in the range of between 20° and 150° C., in the presence of a Friedel-Crafts catalyst at a temperature in the range of between 20° and 150° C. whereby an organic reaction mixture comprising the polymerized resin is obtained, washing the organic reaction mixture with an alkaline or acid solution, then with water until neutralization at a temperature in the range of between 70° and 100° C. and submitting the washed organic reaction mixture to a distillation carried out by progressively raising the temperature to 250° C. in order to eliminate the hydrocarbon solvent, and to recover a product having a softening point of between 60° and 110° C., and a Gardner color index of less than 9.

2. A process according to claim 1, wherein the C₅ hydrocarbon cut is obtained by distillation between 10° and 50° C. of a hydrocarbon mixture issuing from a steam cracking of naphtha or gas-oil.

3. A process according to claim 1, wherein the C₅ hydrocarbon cut contains less than 3% isoprene.

4. A process according to claim 1, wherein the C₅ hydrocarbon cut contains less than 0.5% cyclopentadiene.

5. A process according to claim 1, wherein the catalyst is aluminium chloride used in the proportion of 0.1 to 5%.

6. A process according to claim 1, wherein the catalyst is aluminium chloride used in the proportion of 0.5 to 2%.

7. A process according to claim 1, wherein the hydrocarbonated solvent is constituted by the hydrocarbons which did not react during the polymerization.

8. Petroleum resins prepared according to claim 1.

* * * * *